Jan. 13, 1931. R. D. ZUCKER Re. 17,927

HUMIDOR

Original Filed May 18, 1927

INVENTOR
R. D. Zucker
BY
Mitchell & Bechert
ATTORNEY

Reissued Jan. 13, 1931 Re. 17,927

UNITED STATES PATENT OFFICE

RICHARD D. ZUCKER, OF TENAFLY, NEW JERSEY, ASSIGNOR, BY MESNE ASSIGNMENTS, TO THE RUMIDOR CORPORATION, OF UNION CITY, NEW JERSEY, A CORPORATION OF NEW JERSEY

HUMIDOR

Original No. 1,704,908, dated March 12, 1929, Serial No. 192,218, filed May 18, 1927. Application for reissue filed November 15, 1930. Serial No. 496,029.

My invention relates to certain new and useful improvements in humidors, so called, and comprises a receptacle in which merchandise such as tobacco is to be maintained in a moist state.

The object of the invention is to provide, in connection with such a receptacle, means whereby the humidifying element may be easily inserted or renewed.

A further object is to provide means whereby the humidifying action may be controlled.

Another object is to provide an exceedingly simple and efficient construction which lends itself admirably to rapid production.

These and other objects will be apparent to anyone skilled in this art from a reading of the following description and an examination of the accompanying drawings, in which I have shown my invention in one preferred form, and in which—

Figure 1:
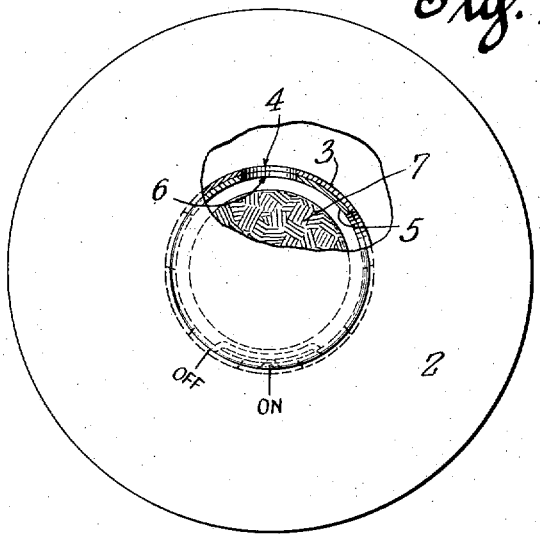
Fig. 1 is a plan view partly broken away and in section.
Figure 3:
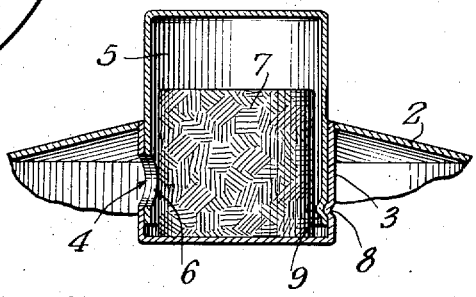
Fig. 3 is a section on the line 3—3 of Fig. 2.
Figure 2:
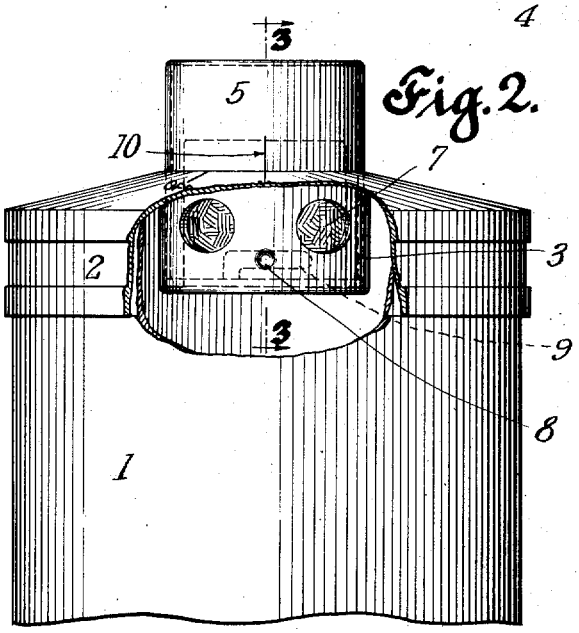
Fig. 2 is a side elevation also partly broken away and in section.

1 represents a receptacle of any desired form and material. 2 is a detachable cover therefor. In the central part of the cover is a cup-shaped depression 3 having one or more vent passages 4 in the wall thereof at one side of the axis of said depression. 5 is what I will term a valve. This valve is shown as cup-shaped, and is inverted so that its open end will project down into the cup-shaped depression 3, as clearly seen in Fig. 3, and so that it will overstand the vent passage 4. 6 is an opening in the side wall of the valve 5 which, by rotating the said valve, may be caused to register more or less with the vent opening 4, whereby the interior of the cup-shaped valve member 5 will be placed in communication with the interior of the receptacle. 7 represents a humidifying element or moistener, which may be of any suitable material which may hold and give off moisture. 8 is a detent on the inner wall of the cup-shaped depression 3, which forms a stud, which may interlock in a bayonet slot 9 in the lower part of the valve member 5 so that said valve member 5 may be detachably held in place, whereby the outer end of the valve member 5 may act as a handle or knob for the cover 2, as well as a means for operating the valve to open and close the vent passage 4. In the drawings I have shown a plurality of vent passages which put the interior of the valve member in communication with the interior of the receptacle, two such vent passages appearing in Fig. 2.

In operation, it will be understood that the valve member 5 may be disconnected from the cover 2, and the humidifying member 7 may be inserted, whereupon the valve member is replaced in the operative position and turned to the desired degree to open the vent 4. Suitable indicating means may be provided to indicate the degree to which this vent is opened or closed, one simple means comprising two marks on the cover, one bearing the word "Off" and the other bearing the word "On", while on the side of the valve member 5 I provide an indicating mark 10 which is so placed that when this mark stands next to the word "On", it will be understood that the vent is fully opened, and when this mark stands next to the word "Off", it will be understood that the vent is completely closed. This, of course, constitutes merely one form of indicating means.

I have shown and described my invention in one specific form and as applied to one specific use, and I wish to have it understood that I am aware that various modifications in many respects may be made without departing from the spirit or scope of this invention.

I claim:

1. A humidor comprising a receptacle, a cover, the central part thereof having a cupped depression closed upon its lower surface having a vent passage therein, an inverted cup-shaped valve, the lower part thereof being rotatably mounted in said cupped depression, and a passage in said valve whereby by rotating said valve more or less of the vent opening in the cover may be exposed, said cupped depression and inverted cup-shaped valve constituting a housing for a moistener element.

2. A humidor comprising a receptacle, a cover, the central part thereof having a cupped depression closed upon its lower surface having a vent passage therein, an inverted cup-shaped valve, the lower part thereof being rotatably mounted in said cupped depression, and a passage in said valve whereby by rotating said valve more or less of the vent opening in the cover may be exposed, said vent passage being in the side wall of said depression and said passage in the valve being in the side wall thereof, said cupped depression and inverted cup-shaped valve constituting a housing for a moistener element.

3. A humidor comprising a receptacle, a removable covering having a cup-shaped depression therein closed upon its lower surface, a vent passage eccentrically located relatively to the axis of said depression, an inverted cup-shaped member, the lower part of which is rotatably mounted in the depression in said cover, the upper part of which projects above said cover to form a handle, an opening in said member arranged to register with said vent passage when said member stands in one position, said member closing said vent when it stands in another position.

4. A humidor comprising a receptacle, a removable cover having a cup-shaped depression therein, a vent passage eccentrically located relatively to the axis of said depression, an inverted cup-shaped member, the lower part of which is rotatably mounted in the depression in said cover, the upper part of which projects above said cover to form a handle, an opening in said member arranged to register with said vent passage when said member stands in one position, said member closing said vent when it stands in another position, and means to detachably hold said member in said depression and to limit the rotation thereof.

5. A humidor comprising a receptacle, a cover therefor having a housing formed therein for holding a moistening agent, a vent passage from the interior of said housing to the interior of said receptacle, and a control valve rotatably mounted within said housing for said passage having means on the outside of said cover for operating said valve, said control valve serving as a handle for said cover.

6. A humidor comprising a receptacle, a cover, the central part thereof forming a cup-shaped depression having a vent passage therein, an inverted cup-shaped valve, the lower part thereof being rotatably mounted in said cupped depression, the upper part of said valve extending above said cover and forming a handle for operating said valve, and a passage in said valve whereby by rotating said valve said vent opening may be more or less exposed, said cup-shaped depression and inverted cup-shaped valve constituting a housing for a moisture agent adapted to be completely closed.

7. A humidor body, a cover therefor, said cover having a centrally disposed container for a moistening agent, part of said container being above said cover and part of said container being below said cover, the part of said container above said cover serving as a handle for lifting said cover from said body, that part of said container below said cover having a ventilating passage leading from the interior of said container to the interior of said humidor body.

8. A humidor body, a cover therefor, said cover having a centrally disposed container for a moistening agent, part of said container being above said cover and part of said container being below said cover, said parts having means forming a valve to open and close communication between the interior of said humidor body and the interior of said container, the part of said container above said cover serving as a handle for lifting said cover from said body.

9. A humidor body, a cover therefor, said cover having a cylindrical centrally disposed housing part for housing a moistening agent, and a cylindrical valve part cooperating with said housing part, each of said parts having a radial vent passage therein, said parts being relatively movable to bring said vent passages into and out of registry with each other so as to form a valve to open and close communication between the interior of said humidor body and the interior of a housing formed by said parts, one of said parts projecting above said cover to serve as a handle for lifting said cover from said body.

10. A humidor body, a cover therefor, said cover having a housing part for a moistening agent, and a valve part cooperating with said housing part, one of said parts projecting above said cover to serve as a handle for lifting said cover from said body, said valve part and housing part being relatively movable from the outside of said humidor body for the purpose described.

11. A humidor body, a cover therefor, said cover having a centrally disposed moistening agent housing portion extending from one side thereof, a valve portion cooperating with said housing portion and movable relatively thereto from the outside of said humidor body for the purposes described, one of said portions projecting above said cover and serving as a handle for said cover.

12. A humidor body, a cover therefor having a vent passage to the interior of said body, means for confining a moistening agent and having a passage cooperating with said first mentioned passage to open communication between the interior of said body and the interior of said means, said means extending above said cover to form a handle for lifting said cover, said means being rotatable relatively to said cover from the outside thereof by said handle for bringing said passages into and out of registry for the purpose described.

13. A humidor body, a cover therefor, said cover having a centrally disposed container for a moistening agent, part of said container being above said cover and part of said container being below said cover, the part of said container above said cover serving as a handle for lifting said cover from said body, that part of said container below said cover having a ventilating passage leading from the interior of said container to the interior of said humidor body, and means for controlling said passage.

RICHARD D. ZUCKER.